US008843235B2

(12) United States Patent
Ota et al.

(10) Patent No.: US 8,843,235 B2
(45) Date of Patent: Sep. 23, 2014

(54) ROBOTS, COMPUTER PROGRAM PRODUCTS, AND METHODS FOR TRAJECTORY PLAN OPTIMIZATION

(75) Inventors: Yasuhiro Ota, Union, KY (US); Junggon Kim, Pittsburgh, PA (US); James J. Kuffner, Mountain View, CA (US)

(73) Assignees: Toyota Motor Engineering & Manufacturing North America, Inc., Erlanger, KY (US); Carnegie Mellon University, Pittsburgh, PA (US)

( * ) Notice: Subject to any disclaimer, the term of this patent is extended or adjusted under 35 U.S.C. 154(b) by 305 days.

(21) Appl. No.: 13/350,179

(22) Filed: Jan. 13, 2012

(65) Prior Publication Data

US 2013/0184866 A1 Jul. 18, 2013

(51) Int. Cl.
*B25J 9/06* (2006.01)

(52) U.S. Cl.
USPC .................................. 700/250; 901/2; 901/15

(58) Field of Classification Search
CPC ........... G05B 2219/39049–2219/39052; G05B 2219/39121; G05B 2219/39144; G05B 2219/39109; B25J 9/1682; B25J 9/0084
See application file for complete search history.

(56) References Cited

U.S. PATENT DOCUMENTS

| | | | |
|---|---|---|---|
| 3,985,238 A | 10/1976 | Nakura et al. | |
| 4,300,198 A | 11/1981 | Davini | |
| 4,308,584 A | 12/1981 | Arai et al. | |
| 4,530,636 A | 7/1985 | Inaba et al. | |
| 4,550,383 A | 10/1985 | Sugimoto | |
| 4,633,385 A | 12/1986 | Murata et al. | |
| 4,762,455 A | 8/1988 | Coughlan et al. | |
| 4,974,210 A | 11/1990 | Lee | |
| 4,990,838 A | 2/1991 | Kawato et al. | |
| 5,023,808 A | 6/1991 | Seraji | |
| 5,038,089 A | 8/1991 | Szakaly | |
| 5,336,982 A | 8/1994 | Backes | |
| 6,580,970 B2 | 6/2003 | Matsuda et al. | |
| 6,954,681 B2 | 10/2005 | Fisher et al. | |

(Continued)

FOREIGN PATENT DOCUMENTS

EP      2353796      10/2001

OTHER PUBLICATIONS

Saut, Jean-Philippe, Planning Pick-and-Place tasks with two-hand regrasping, Oct. 2010, The 2010 IEEE/RSJ International Conference on Intelligent Robots and Systems, pp. 4528-4533.*

(Continued)

*Primary Examiner* — Khoi Tran
*Assistant Examiner* — Ryan Rink
(74) *Attorney, Agent, or Firm* — Dinsmore & Shohl LLP (57) ABSTRACT

Robots, computer program products, and methods for trajectory plan optimization are disclosed. In one embodiment, a method of controlling a robot having a first manipulator and a second manipulator includes receiving a trajectory plan including a plurality of sequential motion segments. The method further includes determining a moveable motion segment, and shifting the moveable motion segment and motion segments subsequent to the moveable motion segment backward in time to a shifted time such that one or more unshifted segments of the trajectory plan occur at a same time as one or more shifted segment segments. The method may further include controlling the robot according to the optimized trajectory plan such that one or more components of the first manipulator are moved concurrently with one or more components of the second manipulator.

20 Claims, 7 Drawing Sheets

(56) References Cited

U.S. PATENT DOCUMENTS

| | | | |
|---|---|---|---|
| 6,969,965 B2 | 11/2005 | Takenaka et al. | |
| 7,155,316 B2 | 12/2006 | Sutherland et al. | |
| 7,211,978 B2 | 5/2007 | Chang et al. | |
| 7,245,975 B2 | 7/2007 | Mirza | |
| 7,386,365 B2 | 6/2008 | Nixon | |
| 7,571,025 B2 | 8/2009 | Bischoff | |
| 7,592,768 B2 | 9/2009 | Shirai et al. | |
| 7,751,938 B2 | 7/2010 | Tsusaka et al. | |
| 7,774,099 B2 | 8/2010 | Kobayashi et al. | |
| 7,848,851 B2 | 12/2010 | Nishi et al. | |
| 2003/0023347 A1* | 1/2003 | Konno et al. | 700/245 |
| 2004/0030452 A1 | 2/2004 | Graf et al. | |
| 2004/0068348 A1* | 4/2004 | Jager | 700/255 |
| 2005/0055132 A1* | 3/2005 | Matsumoto et al. | 700/245 |
| 2005/0125099 A1* | 6/2005 | Mikami et al. | 700/245 |
| 2006/0217841 A1* | 9/2006 | Matsumoto et al. | 700/248 |
| 2006/0287769 A1* | 12/2006 | Yanagita et al. | 700/245 |
| 2008/0075561 A1 | 3/2008 | Takemura et al. | |
| 2008/0249663 A1 | 10/2008 | Aoyama | |
| 2009/0069942 A1 | 3/2009 | Takahashi | |
| 2009/0148035 A1 | 6/2009 | Ohno et al. | |
| 2010/0256818 A1 | 10/2010 | Aoba et al. | |
| 2011/0093119 A1 | 4/2011 | Park et al. | |
| 2011/0153076 A1 | 6/2011 | Noro | |
| 2011/0307096 A1* | 12/2011 | Sladek et al. | 700/250 |
| 2012/0136481 A1* | 5/2012 | Maisonnier et al. | 700/257 |
| 2012/0165979 A1* | 6/2012 | Lim et al. | 700/253 |

OTHER PUBLICATIONS

Andrew T. Miller and Peter K. Allen, GraspIt! A Versatile Simulator for Robotic Grasping, IEEE Robotics & Automation Magazine, Dec. 2004.

Corey Goldfeder, Matei Ciocarlie, Hao Dang and Peter K. Allen, The Columbia Grasp Database, authors are with the Dept. of Computer Science, Columbia University, NY, USA.

Kaijen Hsiao, Matei Ciocarlie, and Peter Brook, Bayesian Grasp Planning, Willow Garage Inc., Menlo Park, CA.

Gorges et al, "A Framework for Creating, Coordinating, and Executing Skills on a Humanoid Robot," Humanoids 07, IEEE, 978-1-4244-1862, Jun. 2007, pp. 385-391.

European Search Report issued in corresponding EP application No. 13151030.7, dated Jun. 20, 2014.

* cited by examiner

ROBOTS, COMPUTER PROGRAM PRODUCTS, AND METHODS FOR TRAJECTORY PLAN OPTIMIZATION

TECHNICAL FIELD

The present disclosure generally relates to robot trajectory planning for multi-manipulator robots and, more particularly, multi-manipulator robots, computer program products, and optimized trajectory planning for multi-manipulator robots.

BACKGROUND

Robots may operate within a space to perform particular tasks. For example, servant robots may be tasked with navigating within the operating space, locating objects, and manipulating objects. A robot may be commanded to find an object within the operating space, pick up the object, and move the object to a different location within the operating space. Trajectory plans of existing robots may cause the robot to move its manipulators sequentially, which may provide for motion that looks unnatural compared to human motion. Consider, for example, a mobile manipulator robot instructed to move a bottle from one table to another table. Although sequentially moving a first arm holding the bottle to a transfer position, and then moving the second arm to the transfer position to receive the bottle will accomplish the task, this sequential motion is not how a human would perform the task. In some cases, moving both arms at the same time, instead of moving them one by one, can make the motion appear more natural and time efficient.

Accordingly, a need exists for alternative robots, computer program products and methods for creating optimized trajectory plans such that the robot may move in a more human-like and time efficient manner.

SUMMARY

In one embodiment, a method of controlling a robot having a first manipulator and a second manipulator includes receiving a trajectory plan including a plurality of sequential motion segments. Each motion segment corresponds to a component of the first manipulator or a component of the second manipulator, and the trajectory plan is operable to be executed by the robot to sequentially control the first manipulator and the second manipulator over a time period. The method further includes determining a moveable motion segment within the trajectory plan, and shifting the moveable motion segment and motion segments subsequent to the moveable motion segment backward in time to a shifted time such that one or more unshifted segments of the trajectory plan occur at a same time as one or more shifted segment segments, thereby generating an optimized trajectory plan. The method may further include controlling the robot according to the optimized trajectory plan such that one or more components of the first manipulator are moved concurrently with one or more components of the second manipulator.

In another embodiment, a computer program product for use with a computing device to create an optimized trajectory plan for controlling a robot having a first manipulator and a second manipulator includes a computer-readable medium storing computer-executable instructions for generating the optimized trajectory plan. The computer-executable instructions, when executed by a processor, cause the computing device to receive a trajectory plan including a plurality of sequential motion segments, wherein each motion segment corresponds to a component of the first manipulator or a component of the second manipulator, and the trajectory plan is operable to be executed by the robot to sequentially control the first manipulator and the second manipulator over a time period. The computer-executable instructions further causes the computing device to determine a moveable motion segment within the trajectory plan, and shift the moveable motion segment and motion segments subsequent to the moveable motion segment backward in time to a shifted time. The moveable motion segment and subsequent motion segments are shifted such that one or more unshifted segments of the trajectory plan occur at a same time as one or more shifted segment segments, thereby generating the optimized trajectory plan.

In yet another embodiment, a robot includes a first manipulator mechanically coupled to one or more first manipulator actuators, a second manipulator mechanically coupled to one or more second manipulator actuators, a processor, and a computer-readable medium storing computer-executable instructions for generating an optimized trajectory plan. The computer-executable instructions, when executed by the processor, cause the robot to receive a trajectory plan including a plurality of sequential motion segments. Each motion segment corresponds to a component of the first manipulator or a component of the second manipulator, and the trajectory plan is operable to be executed by the robot to sequentially control the first manipulator and the second manipulator over a time period. The computer-executable instructions further cause the robot to determine a moveable motion segment within the trajectory plan, and shift the moveable motion segment and motion segments subsequent to the moveable motion segment backward in time to a shifted time. The moveable motion segment and subsequent motion segments are shifted such such that one or more unshifted segments of the trajectory plan occur at a same time as one or more shifted segment segments, thereby generating the optimized trajectory plan. The computer-executable instructions may further cause the robot to execute the optimized trajectory plan such that one or more components of the first manipulator are moved concurrently with one or more components of the second manipulator.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to robots with multiple manipulators, computer program products, and methods for optimizing multiple manipulator trajectory plans. Particularly, embodiments are directed to controlling a robot with two arms such that the robot moves in a more natural, human-like manner so that the actions of the robot may appear more pleasing to observers of the robot. As an example and not a limitation, in an action requiring the robot to transfer a target object from one hand to the other, rather than moving the first arm and then the second arm after completion of the movement of the first arm, the second arm may move at the same time as the first arm in anticipation of receiving the target object. The motion of the robot would look unnatural to a human observer if it were to move each of its arms in sequence, as described below. Moving both arms at the same time may look more natural to the human observer. Such motion may not only look more human-like, but also may complete the desired task more quickly. Other actions may include, but are not limited to, opening or closing a door, for example. Various embodiments of robots, and computer program products and methods for creating optimized trajectory plans for controlling a robot are described below.

Figure 1:
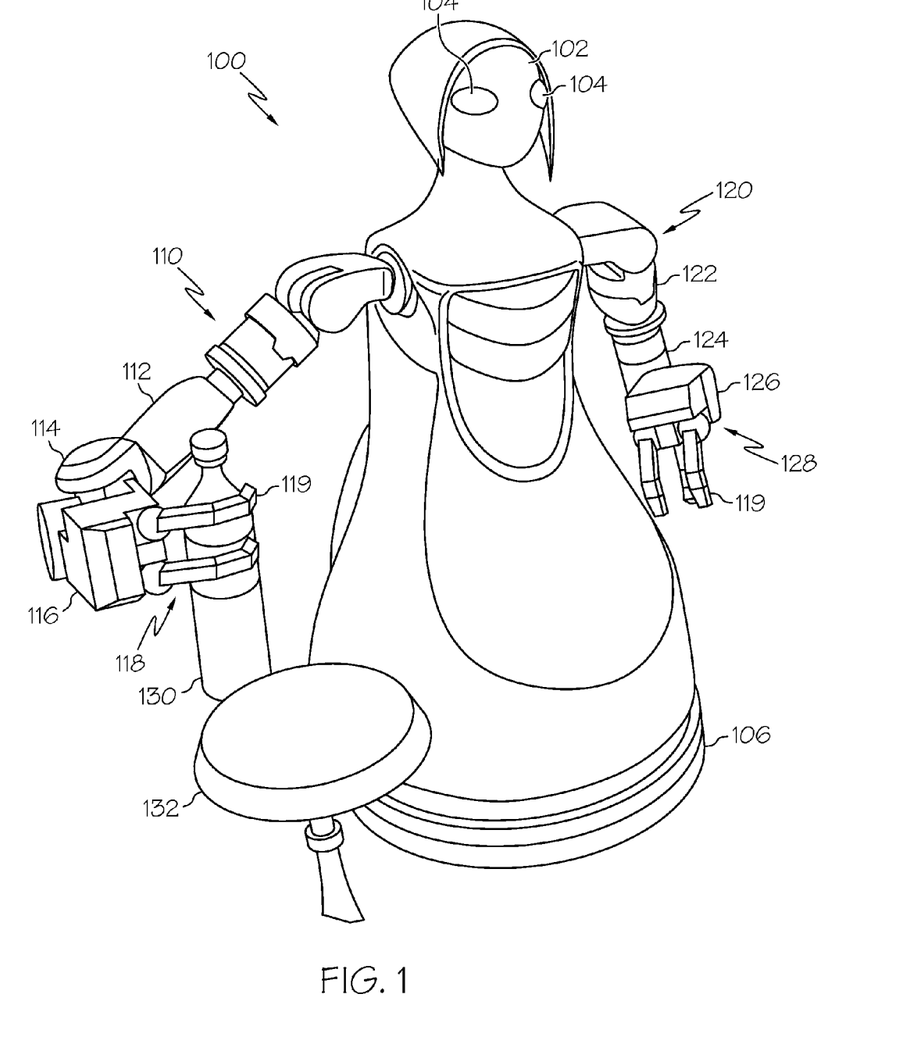
FIG. 1 depicts a schematic illustration of an exemplary robot manipulating a target object according to one or more embodiments shown and described herein.

Referring initially to FIG. 1, a robot 100 according to one exemplary embodiment is illustrated. It should be understood that the robot 100 illustrated in FIG. 1 is for illustrative purposes only, and that embodiments are not limited to any particular robot configuration. The robot 100 has a humanoid appearance and is configured to operate as a service robot. For example, the robot 100 may operate to assist users in the home, in a nursing care facility, in a healthcare facility, and the like. Generally, the robot 100 comprises a head 102 with two cameras 104 that are configured to look like eyes, a locomotive base 106 for moving about in an operational space, a first manipulator 110 and a second manipulator 120. The first and second manipulators 110, 120 each comprise an arm component (e.g., a robot arm comprising an upper arm 112, 122 and a forearm 114, 124) and a hand component 118, 128, respectively. The hand component 118, 128 may comprise a robot hand comprising a hand portion 116, 126 and a plurality of fingers 119 that may be opened and closed to manipulate a target object, such as a bottle 130. The upper arm component 112, 122, the forearm component 114, 124 and hand component 118, 128 are each a particular component type of the first and second manipulator.

The robot 100 may be programmed to operate autonomously or semi-autonomously within an operational space, such as a home. In one embodiment, the robot 100 is programmed to autonomously complete tasks within the home throughout the day, while receiving audible (or electronic) commands from the user. For example, the user may speak a command to the robot 100, such as "please bring me the bottle on the table." The robot 100 may then go to the bottle 130 and complete the task. In another embodiment, the robot 100 is controlled directly by the user by a human-machine interface, such as a computer. The user may direct the robot 100 by remote control to accomplish particular tasks. For example, the user may control the robot 100 to approach a bottle 130 positioned on a table 132. The user may then instruct the robot 100 to pick up the bottle 130. The robot 100 may then develop a trajectory plan for its first and second manipulators 110, 120 to complete the task. As described in more detail below, embodiments are directed to creating trajectory plans that are optimized for reduced execution time and for more human-like motion.

Figure 2:
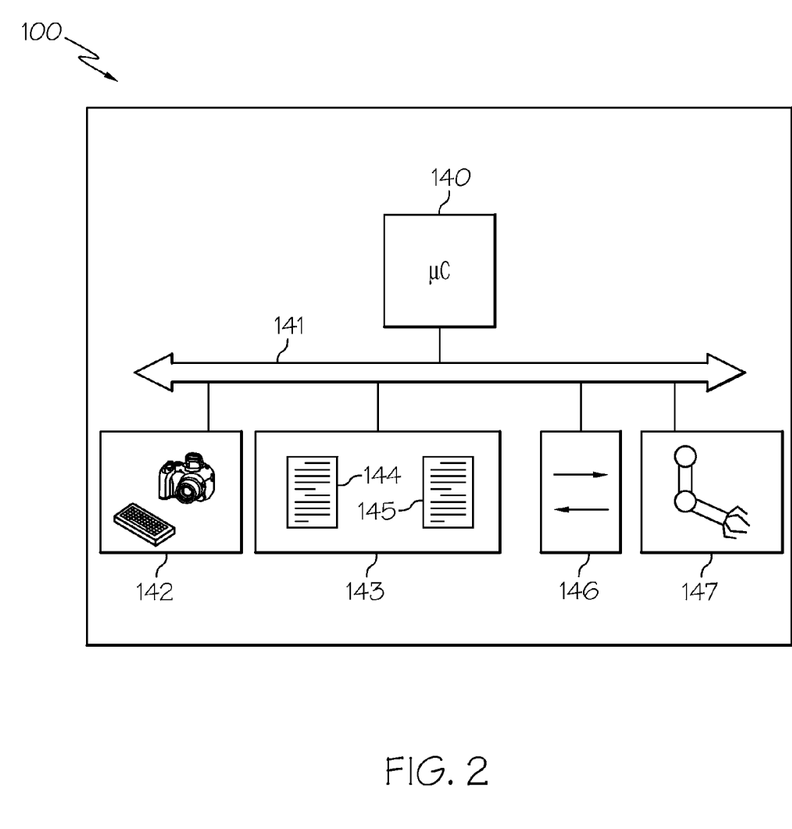
FIG. 2 depicts a schematic illustration of additional exemplary components of an exemplary robot according to one or more embodiments shown and described herein.

Referring now to FIG. 2, additional components of an exemplary robot 100 are illustrated. More particularly, FIG. 2 depicts a robot 100 (or a computing device) for creating optimized trajectory plans, and/or a computer program product comprising non-transitory computer-readable medium for creating optimized trajectory plans embodied as hardware, software, and/or firmware, according to embodiments shown and described herein. It is noted that the computer program products and methods for optimizing trajectory plans may be executed by a computing device that is external to the robot 100 in some embodiments. For example, a general purpose computer (not shown) may have computer-executable instructions for creating optimized trajectory plans loaded thereon. The optimized trajectory plans may then be sent to the robot 100.

The robot 100 illustrated in FIG. 2 comprises a processor 140, input/output hardware 142, a non-transitory computer-readable medium 143 (which may store robot data/logic 144, and trajectory optimization logic 145, for example), network interface hardware 146, and actuator drive hardware 147 to actuate the robot's manipulators (e.g., servo drive hardware). It is noted that the actuator drive hardware 147 may also include associated software to control the various actuators of the robot.

The memory component 143 may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 143 may be configured to store, among other things, robot data/logic 144 and trajectory optimization logic 145, as described in more detail below. A local interface 141 is also included in FIG. 2 and may be implemented as a bus or other interface to facilitate communication among the components of the robot 100 or the computing device.

The processor 140 may include any processing component configured to receive and execute instructions (such as from the memory component 143). The input/output hardware 142 may include any hardware and/or software for providing input to the robot 100 (or computing device), such as, without limitation a keyboard, mouse, camera, microphone, speaker, touch-screen, and/or other device for receiving, sending, and/or presenting data. The network interface hardware 146 may include any wired or wireless networking hardware, such as a modem, LAN port, wireless fidelity (Wi-Fi) card, WiMax card, mobile communications hardware, and/or other hardware for communicating with other networks and/or devices.

It should be understood that the memory component 143 may reside local to and/or remote from the robot 100 and may be configured to store one or more pieces of data for access by the robot 100 and/or other components. It should also be understood that the components illustrated in FIG. 2 are merely exemplary and are not intended to limit the scope of this disclosure. More specifically, while the components in FIG. 2 are illustrated as residing within the robot 100, this is a nonlimiting example. In some embodiments, one or more of the components may reside external to the robot 100, such as within a computing device that is communicatively coupled to one or more robots.

Figure 3:
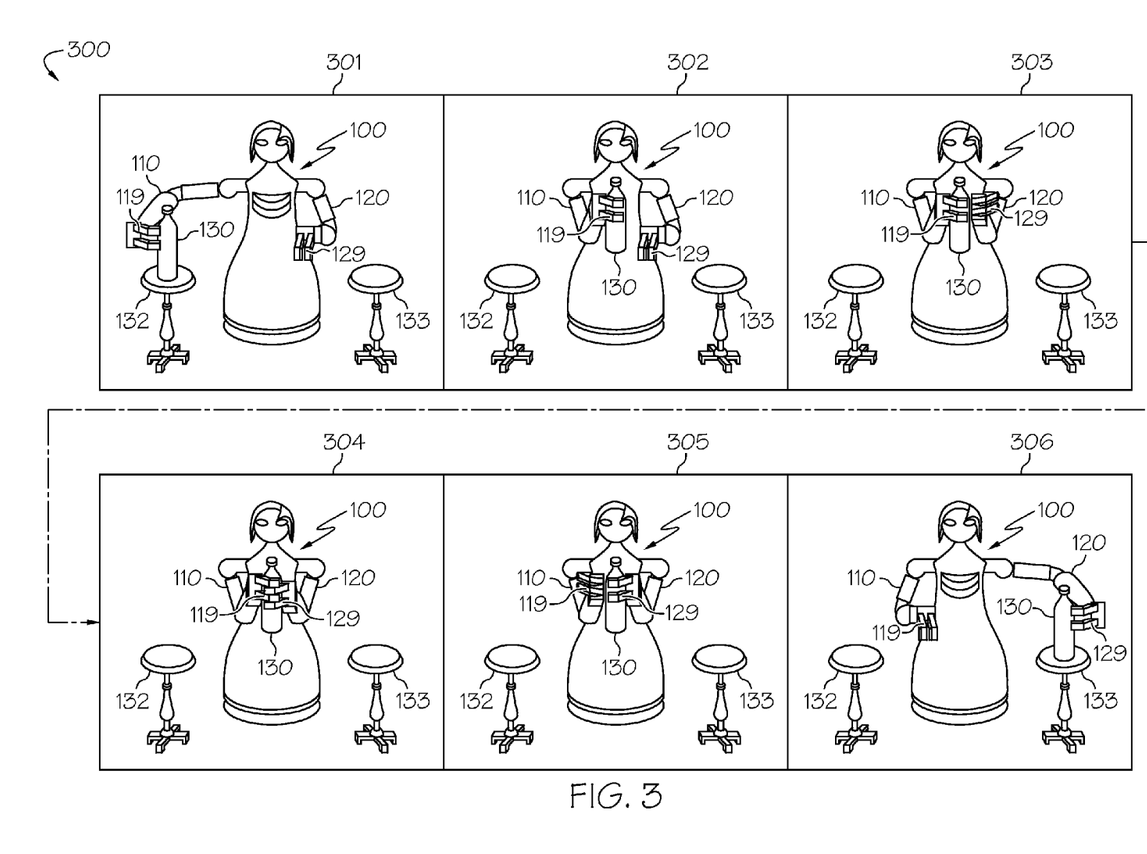
FIG. 3 depicts a schematic illustration of a timeline showing the movement of a robot resulting from a non-optimized trajectory plan.

FIG. 3 depicts a timeline 300 showing the movement of a robot resulting from a non-optimized trajectory plan. The timeline 300 comprises frames 301-306 that show the robot's movement over time to pick up a bottle 130 from a first table 132 with a first manipulator 110, transfer the bottle 130 from the first manipulator 110 to a second manipulator 120, and place the bottle on a second table 133. As shown and described below, the robot's motion does not appear natural as compared to the motion of a human completing the same task. It should be understood that motions depicted in the figures are for illustrative purposes only and do not limit the embodiments described herein.

At frame 301, the robot 100 grasps the bottle 130 with a first manipulator 110 (i.e., with a hand of the first manipulator). The robot 100 may move the first manipulator 110 to a location close to the bottle 130 with open fingers, and then close its fingers around the bottle 130. At frame 302, the robot has moved the first manipulator 110 and bottle 130 to a transfer position. Note that the second manipulator 120 remained stationary while the first manipulator 110 was moving. This is not how a human would complete this task. A human would move his or her left arm while the right arm is moving the object toward the transfer position. At frames 303-305, the robot 100 opens the fingers 129 of the second manipulator 120 to receive the bottle 130, closes the fingers 129 of the second manipulator 120, and opens the fingers 119 of the first manipulator 110 to complete the transfer of the bottle 130. At frame 306, the robot 100 has moved the second manipulator 120 toward the second table 133 to place the bottle 130 on the second table 133. As described in more detail below, embodiments described herein parallelize the actions of the robot to achieve motion that is more human-like than those motions depicted in FIG. 3.

Figure 4:
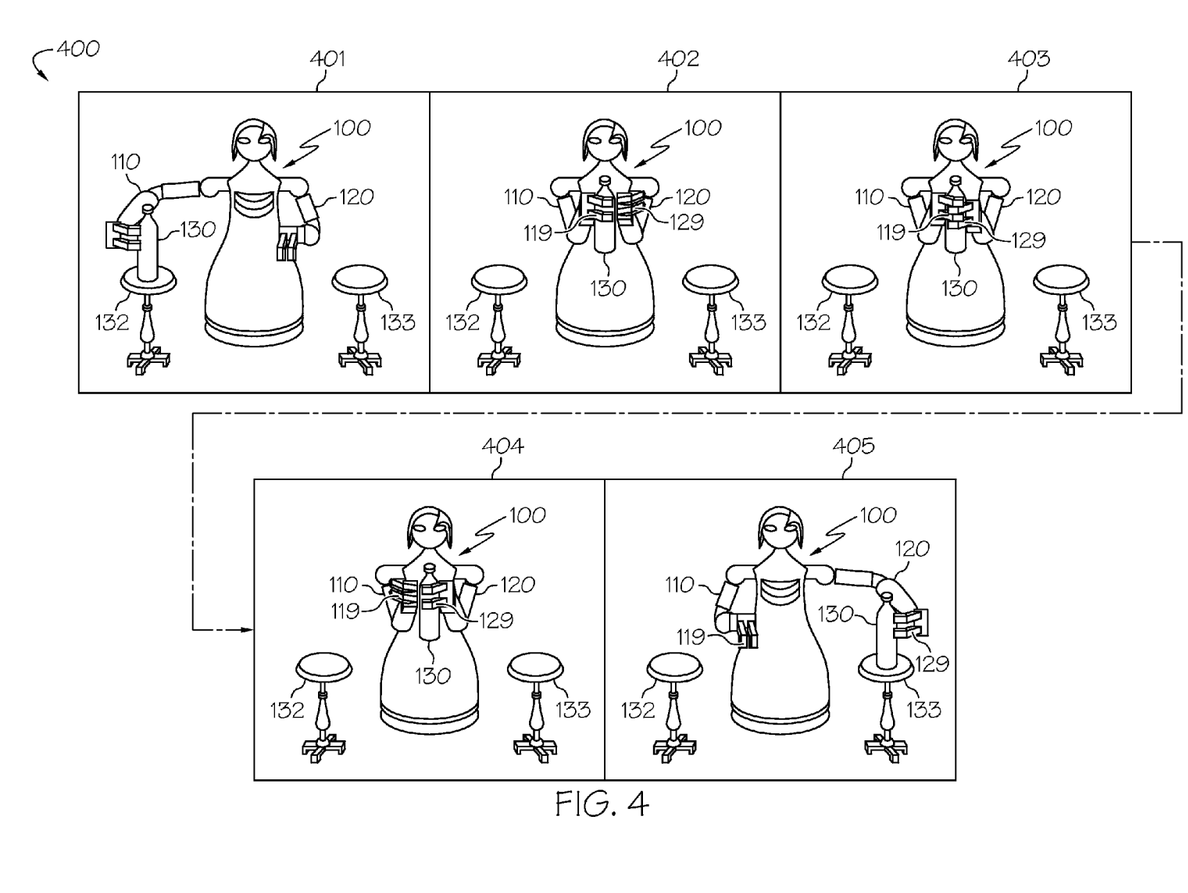
FIG. 4 depicts a schematic illustration of a timeline showing the movement of a robot resulting from an optimized trajectory plan according to one or more embodiments shown and described herein.

FIG. 4 depicts the motion of a robot 100 using an optimized trajectory plan according to one or more embodiments described herein to complete the same bottle 130 manipulating tasks as depicted in FIG. 3. Frame 401 depicts motion of the robot 100 that is similar to that of frame 301 of FIG. 3. However, in frame 402, the second manipulator 120 moves concurrently with the first manipulator 110 in anticipation of receiving the bottle 130, just as how a human would move to complete the transfer of an object from one hand to the other. Because both first and second manipulators 110, 120 move concurrently, the time it takes to complete the optimized trajectory plan is less than the non-optimized trajectory plan 300. Transfer of the bottle 130 to the second table 132 is performed in frames 403-405 as described above with respect to FIG. 3 (i.e., opening and closing the fingers of the manipulators to transfer the bottle 130 from the first manipulator 110 to the second manipulator 120, and moving the second manipulator 120 toward the second table 132).

Figure 5A:
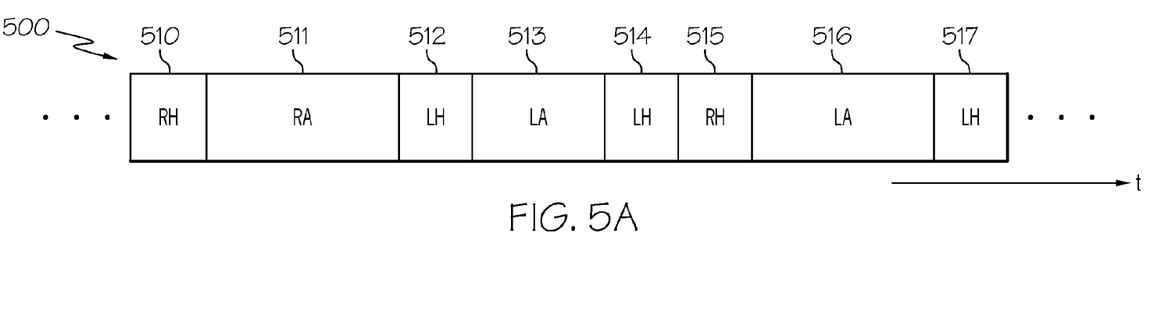
FIG. 5A depicts a schematic illustration of a non-optimized trajectory plan.

Referring now to FIG. 5A, a non-optimized trajectory plan 500 in accordance with the robot motion depicted in FIG. 3 is illustrated. The trajectory plan 500 may be received by the robot 100, or generated by the robot 100 internally by a reject from the user or from an external source. The trajectory plan 500 comprises a plurality of motion segments that represent the movement of a particular component of a manipulator over time. In the illustrated embodiment, "RH" stands for a right hand component (e.g., a hand component 118 of the first manipulator 110), "RA" stands for a right arm component, "LH" stands for a left hand component, and "LA" stands for a left arm component (e.g., an arm component 122 of the second manipulator 120).

The trajectory plan may be comprised of inverse kinematic instructions that are provided to the actuator drive hardware that control the manipulators of the robot. The trajectory plan may be configured as any instructions that are operable move the robot. Actual inverse kinematics or other instructions used to control the robot are not described herein. Embodiments are not limited to any particular type of robot programming.

The each motion segment of the trajectory plan 500 corresponds to the motion of the robot 100 illustrated in FIG. 3. At motion segment 510, the robot closes its fingers of the right hand around the target object (e.g., the bottle 130 depicted in FIG. 3). After the robot has secured the target object in its right hand, it then moves its right arm to the transfer position in motion segment 511. Once the right arm and right hand are in the transfer position, the left arm is actuated and moves to the transfer position in motion segment 512. In motion segment 514, the left hand closes to grasp the target object in both the left and right hands. In motion segment 515, the right hand opens to release the target object. Next, the robot moves its left arm toward a destination location (e.g., the second table 132) in motion segment 516, and then opens its left hand to completely release the target object at the destination. Again, the non-optimized trajectory plan 500 may yield robot motion that is not human like, and takes a long period of time to execute.

Embodiments described and illustrated herein may optimize the received or otherwise developed non-optimized trajectory plan by determining a moveable motion segment, and then moving that moveable motion segment and all of the subsequent motion segments backward in time to a shifted location. By moving the moveable motion segment and the motion segments that occur subsequent to the moveable motion segment backward in time, the trajectory plan becomes parallelized such that original trajectory plan becomes split and portions are executed currently by the robot. The optimized trajectory plans yield more human-like motion executed by the robot.

Figure 5B:
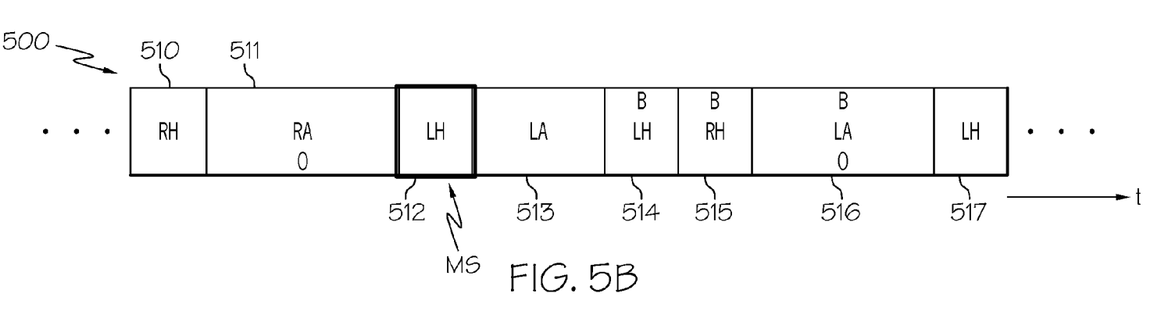
FIG. 5B depicts a schematic illustration of a moveable motion segment of a trajectory plan according to one or more embodiments shown and described herein.

Referring now to FIG. 5B, first a moveable motion segment MS is determined after each motion segment is labeled appropriately (e.g., "RH," RA," etc.). In some embodiments, the motion segments will already be labeled when received by the robot. A motion segment is considered moveable if it (and its successors) can be shifted backward in time without causing a conflict between the manipulators, or a target object that is being manipulated (e.g., dropping the target object). In one embodiment, each motion segment is evaluated to determine moveability, starting from the last motion segment (e.g., rightmost motion segment 517) toward the first motion segment (e.g., leftmost motion segment 510).

A motion segment may be set as moveable if it satisfies certain conditional rules. In one embodiment, a motion segment is considered moveable if a predecessor motion segment that is adjacent to the particular motion segment being evaluated does not correspond to the same manipulator as the particular motion segment. For example, if a particular motion segment is labeled as "RA," and its predecessor motion segment is also labeled as "RA," it will not be considered moveable. It may not be desirable to stop a component of a manipulator from doing an action that it is supposed to be doing to perform a different action.

A moveable motion segment should also not be bonded to other motion segments as a bonded motion segment. A bonded motion segment is one that is associated with one or more additional motion segments. Referring to FIG. 5B, motion segments 514-516 are considered bonded because the robot transfers the target object from the right hand to the left hand during these motion segments. If one or more of motion segments 514-516 were to be moved out of the bonded order, the robot would drop the target object, or fail to transfer the target object from one hand to the other hand successfully.

A moveable motion segment should also have only one moving component associated with it. In other words, there should not be dual-arm motion in the motion segment.

In the present example, motion segment 512 is set as a moveable motion segment MS in FIG. 5B because it satisfies the above-described conditions. Therefore, motion segment 512 and all of the successor motion segments (513-517) may be moved backward in time to parallelize the trajectory plan 500.

Next, the shifted time to which the moveable motion segment may be shifted to is determined. The moveable motion segment and its successors should be shifted backwards in time such that there is no conflict between any of the shifted motion segments with any of the unshifted segments. In one embodiment, multiple shifted times are determined and the shifted time that is the shortest is selected as the shifted time. Each shifted motion segment may be evaluated to determine how far back in time it may be shifted. The shifted time for all of the moveable motion segment should be such that conflict between components of the manipulators and the target object are avoided.

According to one embodiment, one or more conditional rules may be applied to determine a possible shifting time for a particular motion segment. A motion segment should not be shifted over other motion segments that manipulate the same target object. Referring to FIG. 5B as a non-limiting example, motion segment 516, which manipulates a target object O, cannot be shifted backward in time so that it occurs at the same time or before motion segment 511, which also manipulates target object O. Shifting moveable motion segment 512 and its successors to a shifted time that causes motion segment 516 to be shifted at or before motion segment 511 would cause a conflict.

Additionally, a particular motion segment under evaluation should not be shifted over other motion segments associated with a same component. As an example and not a limitation, motion segment 515 is associated with a right hand component of a manipulator, and should not be shifted over motion segment 510, which is also associated with the same right hand component. This would cause a conflict between the two motion segments.

Further, bonded motion segments should not be shifted past the time at which the moveable motion segment starts to ensure that the optimized trajectory plan will manipulate the target object successfully when executed by the robot. In the present example, bonded motion segments 514-516 should not be shifted passed the end of motion segment 511, which is where moveable motion segment 512 begins. Therefore, bonded motion segment 514 should not be shifted such that it occurs before the end of motion segment 511.

Figure 5C:
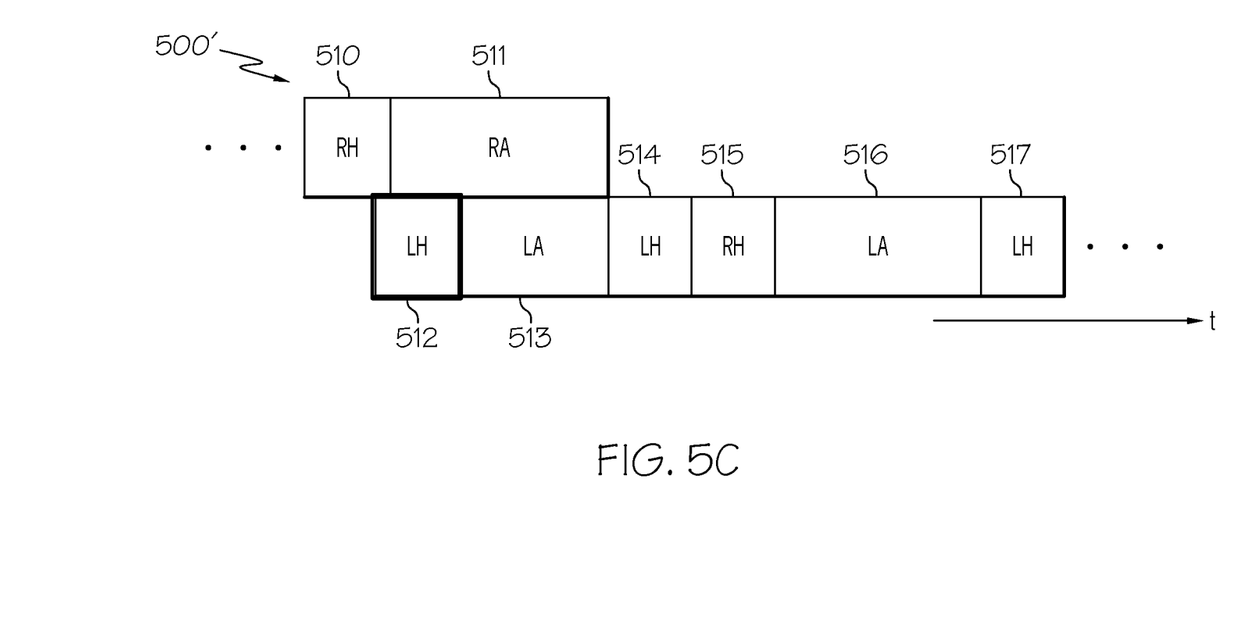
FIG. 5C depicts a schematic illustration of an optimized trajectory plan according to one or more embodiments shown and described herein.

FIG. 5C depicts an exemplary optimized trajectory plan 500' that is a parallelized version of the trajectory plan 500 depicted in FIG. 5A in accordance with the conditional rules described above. As shown in FIG. 5C, motion segment 512 was selected as the moveable motion segment. Moveable motion segment 512 and its successor motion segments 514-517 were then shifted backward it time to a shifted time in accordance with the conditional rules described above such that bonded motion segment 514 does not start until unshifted motion segment 511 is completed. Accordingly, shifted motion segments 512 and 513 occur concurrently with unshifted motion segments 510 and 511 such that the optimized trajectory plan 500' is parallelized.

Figure 6:
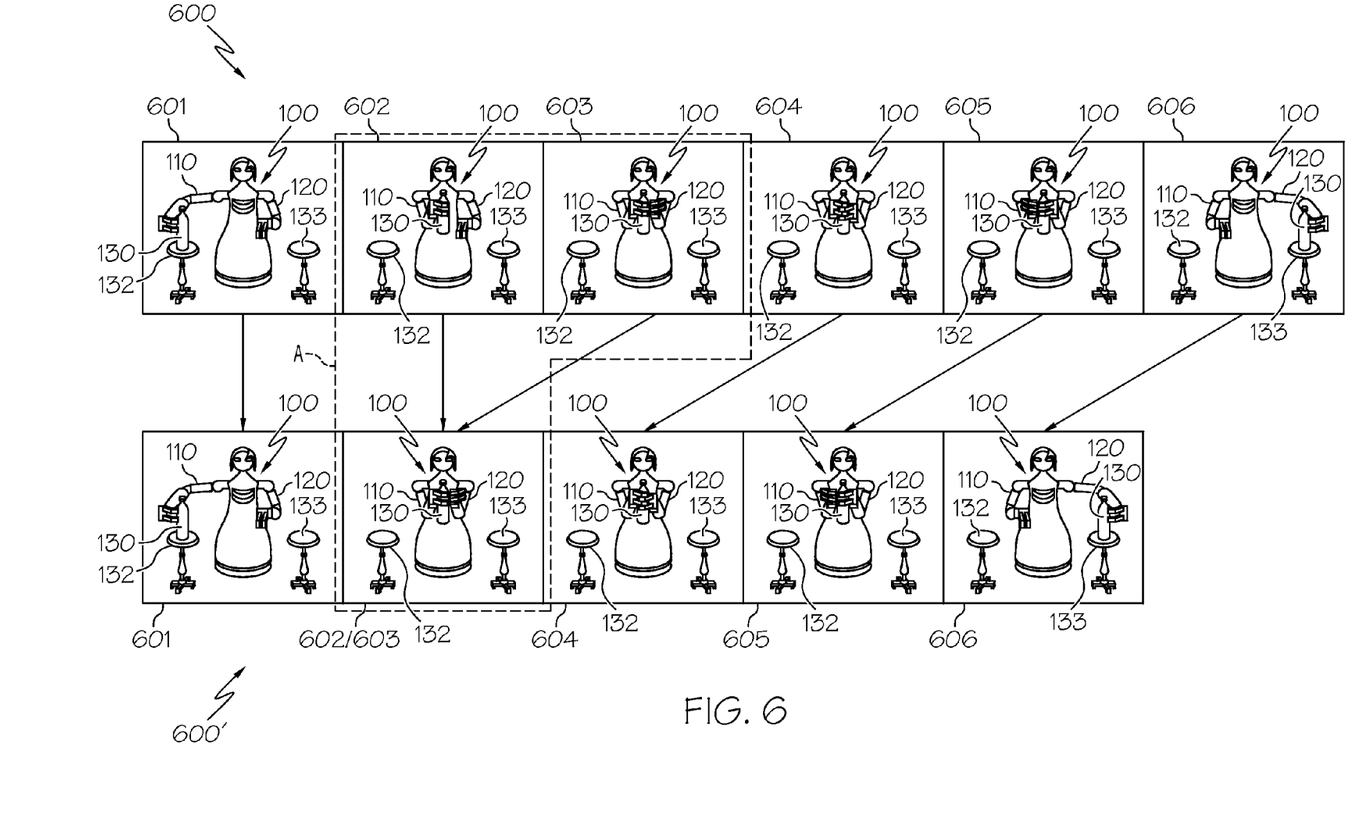
FIG. 6 depicts a schematic illustration of a timeline of both a non-optimized trajectory plan and an optimized trajectory plan according to one or more embodiments shown and described herein.

Referring now to FIG. 6, motions of a robot 100 according to a non-optimized trajectory plan timeline 600 and an optimized trajectory plan timeline 600' are illustrated. It is noted that the frames 601-606 of the non-optimized trajectory plan timeline 600 are identical to those of the non-optimized trajectory plan timeline 300 depicted in FIG. 3. As shown in FIG. 6, robot motion according to frames 602 and 603 are combined into one frame 602/603 of the optimized trajectory plan timeline 600', as indicated by the dashed region A. Accordingly, the robot 100 grasps the bottle 130 with its right hand in frame 601, and then moves its right arm 110 and left arm 120 concurrently to the transfer position in combined frame 602/603. The robot 100 completes the transfer of the bottle 130 between the right hand and the left hand in frames 604 and 605, and then moves the bottle 130 to the second table 133 with the left arm 120 in frame 606. The robot's motion in the optimized trajectory plan timeline 600' is more human-like and more time-efficient than the robot's motion in the non-optimized trajectory plan timeline 600.

In some embodiments, more than one moveable motion segment may be found and shifted to further optimize the motion of the robot. Additionally, different conditional rules may be developed to create desired motion in the robot. Embodiments may also optimize trajectory plans for other robot tasks that require multi-manipulator motion, such as opening a large door, for example.

It should now be understood that the embodiments of the present disclosure optimize robot trajectory plans that have multi-manipulator motion such that the robot moves in a human-like and efficient manner. Robot motion in accordance with trajectory plans that are optimized according to the embodiments described herein may be more predictable to an observer of the robot. For example, an observer of the robot may expect the robot to move both arms which picking up an object and transferring the object between hands. Observers of a robot that moves in accordance with optimized trajectory plans as described herein may be more accepting of the robot.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of controlling a robot comprising a processor, a first manipulator and a second manipulator, the method comprising:

receiving a trajectory plan comprising a plurality of sequential motion segments, wherein each motion segment corresponds to a component of the first manipulator or a component of the second manipulator, and the trajectory plan is operable to be executed by the robot to sequentially control the first manipulator and the second manipulator over a time period;

determining, automatically by the processor, a moveable motion segment within the trajectory plan;

shifting, automatically by the processor, the moveable motion segment and motion segments subsequent to the moveable motion segment backward in time to a shifted time such that one or more unshifted segments of the trajectory plan occur at a same time as one or more shifted segments, thereby generating an optimized trajectory plan; and controlling the robot according to the optimized trajectory plan such that one or more components of the first manipulator are moved concurrently with one or more components of the second manipulator.

2. The method of claim 1, further comprising labeling each motion segment according to a component type of the first manipulator or the second manipulator.

3. The method of claim 2, wherein the component type is a robot arm or a robot hand.

4. The method of claim 1, wherein determining the moveable motion segment comprises evaluating each motion segment starting from a last motion segment in the time period toward a first motion segment in the time period by determining if moving each motion segment would cause a conflict between the first manipulator, the second manipulator, or a target object.

5. The method of claim 1, wherein a particular motion segment is moveable when:
a predecessor motion segment adjacent to the particular motion segment does not correspond to a same manipulator as the particular motion segment;
the particular motion segment is not bonded to any other motion segments; and
the particular motion segment corresponds to only one component of the first manipulator or the second manipulator.

6. The method of claim 1, wherein shifting the moveable motion segment and the subsequent motion segments backward in time comprises determining multiple possible shifting times, and selecting a shortest possible shifting time as the shifted time.

7. The method of claim 1, wherein:
a particular motion segment cannot be shifted over other motion segments that manipulate a same target object;
a particular motion segment cannot be shifted over other motion segments associated with a same component of the first manipulator or the second manipulator as the particular motion segment; and
bonded segments comprising two or more individual motion segments cannot be shifted over a time at which the movable motion segment starts.

8. The method of claim 1, wherein the first manipulator and the second manipulator each comprise an arm and a hand, and the optimized trajectory plan causes the robot to exchange a target object from the hand of the first manipulator to the hand of the second manipulator such that the arm of the first manipulator moves at the same time as the arm of the second manipulator.

9. A computer program product for use with a computing device to create an optimized trajectory plan for controlling a robot comprising a first manipulator and a second manipulator, the computer program product comprising:
a computer-readable medium storing computer-executable instructions for generating the optimized trajectory plan that, when executed by a processor, cause the computing device to:
receive a trajectory plan comprising a plurality of sequential motion segments, wherein each motion segment corresponds to a component of the first manipulator or a component of the second manipulator, and the trajectory plan is operable to be executed by the robot to sequentially control the first manipulator and the second manipulator over a time period;
determine a moveable motion segment within the trajectory plan; and
shift, automatically by the processor, the moveable motion segment and motion segments subsequent to the moveable motion segment backward in time to a shifted time such that one or more unshifted segments of the trajectory plan occur at a same time as one or more shifted segments, thereby generating the optimized trajectory plan.

10. The computer program product of claim 9, wherein the moveable motion segment is determined by an evaluation of each motion segment starting from a last motion segment in the time period toward a first motion segment in the time period to determine if moving each motion segment would cause a conflict between the first manipulator, the second manipulator, or a target object.

11. The computer program product of claim 9, wherein a particular motion segment is moveable when:
a predecessor motion segment adjacent to the particular motion segment does not correspond to a same manipulator as the particular motion segment;
the particular motion segment is not bonded to any other motion segments; and
the particular motion segment corresponds to only one component of the first manipulator or the second manipulator.

12. The computer program product of claim 9, wherein the moveable motion segment and the subsequent motion segments are shifted backward in time by a determination of multiple possible shifting times, and a selection of a shortest possible shifting time as the shifted time.

13. The computer program product of claim 9, wherein:
a particular motion segment cannot be shifted over other motion segments that manipulate a same target object;
a particular motion segment cannot be shifted over other motion segments associated with a same component of the first manipulator or the second manipulator as the particular motion segment; and
bonded segments comprising two or more individual motion segments cannot be shifted over a time at which the movable motion segment starts.

14. The computer program product of claim 9, wherein the computing device is a component of the robot, and the computer-executable instructions further cause the computing device to control the robot according to the optimized trajectory plan such that one or more components of the first manipulator are moved concurrently with one or more components of the second manipulator.

15. The computer program product of claim 14, wherein the first manipulator and the second manipulator each comprise an arm and a hand, and the optimized trajectory plan is operable to cause the robot to exchange a target object from the hand of the first manipulator from the hand of the second manipulator such that the arm of the first manipulator moves at the same time as the arm of the second manipulator.

16. A robot comprising:
a first manipulator mechanically coupled to one or more first manipulator actuators;
a second manipulator mechanically coupled to one or more second manipulator actuators;
a processor;
a computer-readable medium storing computer-executable instructions for generating an optimized trajectory plan that, when executed by the processor, cause the robot to:
receive a trajectory plan comprising a plurality of sequential motion segments, wherein each motion segment corresponds to a component of the first manipulator or a component of the second manipulator, and the trajectory plan is operable to be executed by the robot to sequentially control the first manipulator and the second manipulator over a time period;

determine a moveable motion segment within the trajectory plan;

shift, automatically by the processor, the moveable motion segment and motion segments subsequent to the moveable motion segment backward in time to a shifted time such that one or more unshifted segments of the trajectory plan occur at a same time as one or more shifted segments, thereby generating the optimized trajectory plan; and execute the optimized trajectory plan such that one or more components of the first manipulator are moved concurrently with one or more components of the second manipulator.

17. The robot of claim 16, wherein the first manipulator and the second manipulator each comprise an arm and a hand, and the optimized trajectory plan causes the robot to exchange a target object from the hand of the first manipulator from the hand of the second manipulator such that the arm of the first manipulator moves at the same time as the arm of the second manipulator.

18. The robot of claim 16, wherein the moveable motion segment is determined by an evaluation of each motion segment starting from a last motion segment in the time period toward a first motion segment in the time period to determine if moving each motion segment would cause a conflict between the first manipulator, the second manipulator, or a target object.

19. The robot of claim 16, wherein a particular motion segment is moveable when:

a predecessor motion segment to the particular motion segment does not correspond to a same manipulator as the particular motion segment;

the particular motion segment is not bonded to any other motion segments; and the particular motion segment corresponds to only one component of the first manipulator or the second manipulator.

20. The robot of claim 16, wherein:

a particular motion segment cannot be shifted over other motion segments that manipulate a same target object;

a particular motion segment cannot be shifted over other motion segments associated with a same component of the first manipulator or the second manipulator as the particular motion segment; and bonded segments comprising two or more individual motion segments cannot be shifted over a time at which the movable motion segment starts.

* * * * *